United States Patent [19]

Few

[11] Patent Number: 5,390,965
[45] Date of Patent: Feb. 21, 1995

[54] PIPE CONNECTORS

[75] Inventor: John Few, Edmonton, England

[73] Assignee: Edward Barber & Company Limited, London, England

[21] Appl. No.: 215,732

[22] Filed: Mar. 22, 1994

[30] Foreign Application Priority Data

Mar. 26, 1993 [GB] United Kingdom ............... 9306299

[51] Int. Cl.$^6$ .............................................. F16L 35/00
[52] U.S. Cl. ................... 285/116; 285/342; 285/373
[58] Field of Search ............... 285/116, 171, 373, 419, 285/342, 343

[56] References Cited

U.S. PATENT DOCUMENTS

| | | | |
|---|---|---|---|
| 1,789,379 | 1/1931 | Dillon | 285/373 X |
| 2,902,297 | 9/1959 | Cowon | 285/373 X |
| 3,041,088 | 6/1962 | Brandon | 285/373 X |
| 3,695,640 | 10/1972 | Clague . | |
| 3,720,906 | 3/1973 | Punako et al. . | |
| 3,732,526 | 5/1973 | Punako . | |
| 4,045,060 | 8/1977 | Doigle | 285/373 X |
| 4,183,560 | 1/1980 | Wyss . | |
| 4,807,912 | 2/1989 | Maier | 285/373 X |

FOREIGN PATENT DOCUMENTS

| | | | |
|---|---|---|---|
| 0356364 | 7/1989 | European Pat. Off. . | |
| 356364 | 2/1990 | European Pat. Off. . | |
| 3013312 | 11/1980 | Germany | 285/373 |
| 604067 | 8/1974 | Switzerland | 285/373 |
| 566965 | 1/1945 | United Kingdom . | |
| 646788 | 11/1950 | United Kingdom . | |
| 938829 | 10/1963 | United Kingdom . | |
| 1011610 | 12/1965 | United Kingdom . | |
| 1130835 | 10/1968 | United Kingdom . | |
| 1233371 | 5/1971 | United Kingdom . | |

*Primary Examiner*—Dave W. Arola
*Attorney, Agent, or Firm*—Cushman, Darby & Cushman

[57] ABSTRACT

A pipe connector comprises a body portion 10 having a male threaded tubular portion 12 defining a cavity 14 and comprises a nut 16 with a female threaded portion 18 and an unthreaded portion 20 of lesser diameter defining a bore 22. The junction between the threaded and unthreaded portions 18, 22 is constituted by an annular seat 24 against which is received a thrust washer 26 and against which in turn is received a sealing washer 28 which bears against the end of the male threaded portion 12.

A radially split collar 32 has a pair of radially extending arms 34, 36 at the split and a clamping screw 38 passing through holes in the arms 36 and 34 to receive a nut 40. A radially outwardly extending annular slot 44 is formed at the mouth of the clamping means 30 and is a snap-fit over a flange 42 on the nut 16. When a pipe 46 is passed through the connector and the connector is screwed together, the clamping means 30 may still be rotated to a convenient rotational orientation before the screw 38 is tightened to clamp the exterior surface of the pipe 46.

8 Claims, 1 Drawing Sheet

PIPE CONNECTORS

FIELD OF THE INVENTION

The present invention relates to connectors for forming a fluid-tight connection to a pipe.

BACKGROUND OF THE INVENTION

A type of pipe connection, generically known as a "pack joint", typically comprises a first connector element constituting the main body of the connector which has a male threaded tubular portion for receiving the end of a pipe. The connector further comprises a female threaded nut having a bore therethrough for passage over a pipe to be connected. Received within the nut and located against a radially extending seating therein is a compressible washer which in use is compressed between the said seating and the end of the male threaded portion of the main connector body. This compression in the axial direction causes radial bulging of the sealing washer to seal against the outside of a pipe located in the connector passing through the nut into the tubular portion of the main connector body. It is necessary to restrain the pipe in the joint axially to prevent the pipe being pushed out of the joint by fluid pressure. This has been done by means of a split clamp integral with the rear end of the nut.

SUMMARY OF THE INVENTION

We have now appreciated that this form of clamp poses a number of unnecessary disadvantages. First, we have found that because a portion of the split clamp is joined directly to the back of the nut, tightening of the clamp tends to force a pipe in the nut off centre, this being resisted by the engagement of the pipe in the sealing washer in the joint. This leads to relatively poor engagement between the pipe and the fixed portion Of the split clamp.

Secondly, when the joint is assembled and tightened on a pipe, the operative will not normally be able to tell at what rotational orientation the split clamp will end up when the nut is tightened on to the main body of the connector. Generally it is necessary to use a screwdriver, small spanner, hexagonal key, or similar tool to tighten the split clamp and this will only be possible if the split clamp has come into a suitable rotational alignment with the operatives path of access to the joint. If the joint is being assembled in a trench, there may only be a very limited path of access to the joint for the operative. It may therefore be necessary for the operative to slacken off the connector, rotate the main body to a new position and retighten the connector a number of times before he gets the split clamp into a suitable position when the joint is tightened.

The present invention now provides a connector for forming a fluid-tight connection to a pipe, comprising a first connector element having a cavity therein for receiving an end of the pipe to be connected, a second connector element having a through bore for the passage therethrough of said pipe, and clamping means carried by the second connector element and operable to grip the pipe when present in said bore in said second connector element so as to prevent axial movement of said pipe, said first and second connector elements being connectable together with a said pipe extending through said connector element into said first connector element so as to effect a fluid-tight connection of said pipe to said first connector element, wherein said clamping means is mounted to the second connector element so as to be rotatable with respect thereto at least when not gripping a said pipe.

Preferably, said first and second connector elements are connectable together by means operable to draw said connector elements progressively together axially of a said pipe upon rotation of the connector elements with respect to one another.

Preferably, said connection between the first and second connector elements is by means of inter-engaging threads present on said connector elements.

Optionally however said connection may be of a rotationally operated bayonet fitting type or may of any other suitable mechanism as known in the art.

Preferably, the first connector element bears a male thread and said second connector element bears a corresponding female thread.

The connector preferably comprises a sealing washer within the bore of the second connector element or within the cavity of the first connector element and so located as to be compressed axially of the pipe between said first connector element and the second connector element when said connector elements are connected together. Preferably, a thrust washer is positioned between the sealing washer and one of the first and second connector elements to facilitate rotation thereof whilst compressing the sealing washer.

Preferably said second connector element comprises a radially outwardly protruding flange and said clamping means has a radially inwardly protruding flange co-operating therewith to retain the clamping means on the second connector element for rotation with respect thereto.

Preferably, said clamping means has a radially outwardly extending (radially inwardly facing) annular slot receiving said flange of the second connector element.

Said clamping means is preferably a split clamp provided with a clamping screw or suitable alternative means for tightening the clamp.

Preferably, the first and second connector elements are of metal and the clamping means is of plastics. Optionally however the first and second connector elements may be of plastics also and if desired, the clamping means may be of metal.

BRIEF DESCRIPTION OF THE DRAWINGS

The invention will be illustrated by the following description of a preferred embodiment as illustrated in the accompanying drawings in which.

DETAILED DESCRIPTION OF A PREFERRED EMBODIMENT

Figure 1:
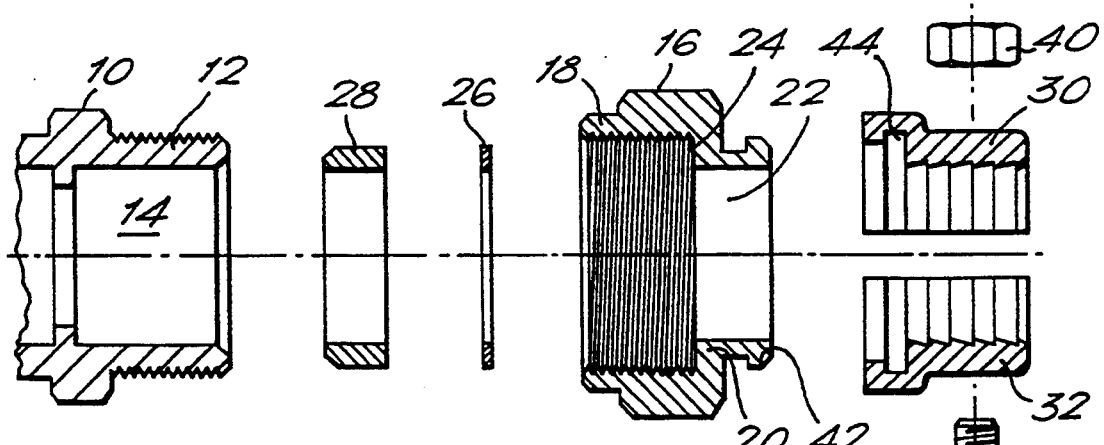
FIG. 1 is an exploded view of a connector according to the invention.
Figure 2:
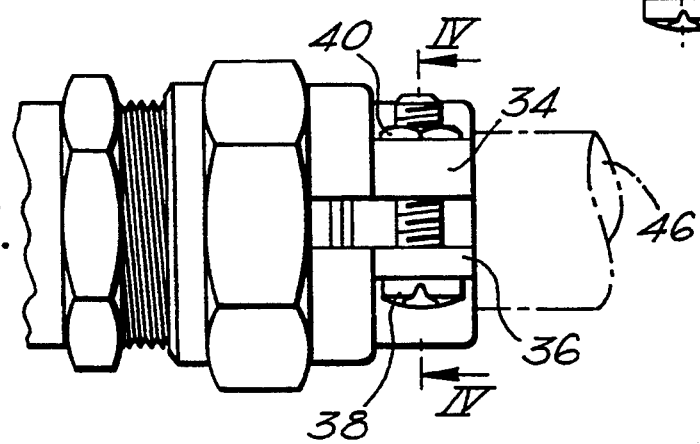
FIG. 2 shows the same connector in an assembled state.
Figure 3:
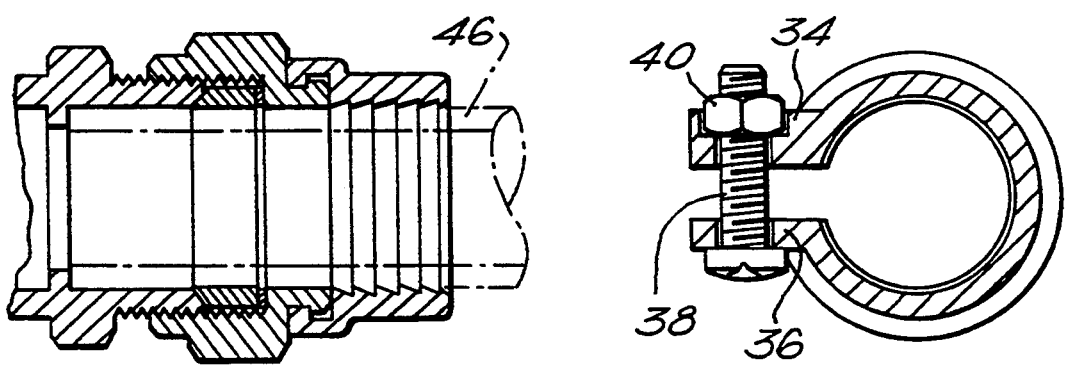
FIG. 3 is a longitudinal cross-section corresponding to FIG. 2.
Figure 4:
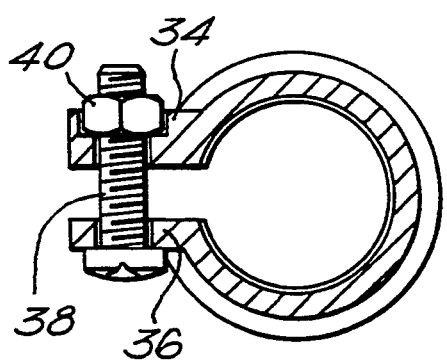
FIG. 4 is a transverse cross-section on the line IV—IV shown in FIG. 2.

The illustrated connector comprises a first connector element or body portion 10 having a male threaded tubular portion 12 defining a cavity 14. A second connector element or nut 16 has a female threaded portion 18 and an unthreaded portion 20 of lesser diameter defining a bore 22 through the second connector element 16. The junction between the threaded and unthreaded portions 18, 22 is constituted by an annular seat 24 against which is received a thrust washer 26 and against which in turn is received a sealing washer 28 of flexible material such as natural or synthetic rubber. In the assembled joint this in turn bears against the end of the male threaded portion 12 of the first connector element 10.

A clamping means 30 comprises a radially split collar 32 having a pair of radially extending arms 34, 36 at the split. A clamping screw 38 passes through holes in the arms 36 and 34 and receives a nut 40. The second connector element has on its rear face a radially outwardly extending annular flange 42. A radially outwardly extending annular slot 44 is formed at the mouth of the clamping means 30 in an enlarged diameter portion thereof which is a snap-fit over the flange 42 so that the clamping means is connected to the second connector element and is rotatable with respect thereto.

In use, a pipe 46 is passed through the clamping means and the second connector element containing the thrust washer 26 and the sealing washer 28. The end of the pipe is pushed into the cavity 14 of the first connector element and the first and second connector elements are screwed together to compress the sealing washer 28 and form a fluid-tight joint. The clamping means 30 may then be rotated to a convenient rotational orientation before the screw 38 is tightened to clamp the exterior surface of the pipe 46.

The clamping means has a self-centring action by virtue of its rotational freedom, thereby providing improved clamping of the pipe 46.

In contrast to the known designs discussed above, the joint can be further tightened by relative rotation of the first and second connector elements without first loosening the clamping means.

The manufacture of the second connector element is simplified by virtue of the clamping element being a separate component.

The connector may be an in-line connector for effecting a connection between two similar pipes. The connection to the second pipe may be through a mechanism similar to that illustrated in the drawings above or may of any other type. The principles of the invention may be applied to other forms of joints such as T or Y-joints or to fittings such as valves or faucets. Alternatively, nothing further may be connected to the pipe other than the connector itself, as in a pipe capping.

Connectors of the type described are suitable for use with a wide variety of pipes including plastics pipes and copper, iron and lead pipes. They are particularly suitable for use in connection with lead pipes because they impose no stringent requirement on the quality of the exterior surface of the pipe against which the sealing washer is compressed radially by virtue of being compressed itself axially between the first and second connector elements.

Such connectors may be employed for effecting connections to pipes for carrying liquid or for carrying gas. The term "pipe" as used herein includes not only pipes for carrying liquid or gas but also tubular conduits for protecting objects such as cables running therethrough.

It is a further advantage of the form of connector specifically described above that the separation effected between the clamping means and the second connector element enables them to be made of different materials. It may often be convenient for the first and second connector elements to be of metal and for the clamping means to be a plastics component, perfectly adequate clamping of the pipe against axial movement being obtainable using a plastics clamping means having regard to the improved clamping force obtained due to the self-centring action of the clamping means described.

Whilst the invention has been described with particular reference to the specific embodiment illustrated in the accompanying drawings, many modifications and variations thereof are possible within the scope of the invention.

I claim:

1. A connector for forming a fluid tight connection to a pipe, comprising a first connector element having a cavity therein for receiving an end of a pipe to be connected, a second connector element having a through bore for the passage therethrough of said pipe, sealing means within one of said first or second connector elements for sealing the pipe to said first connector element and clamping means carried by the second connector element and operable to grip a pipe when present in said bore in said second connector element so as to prevent axial movement of said pipe, said first and second connector elements being connectable together with a said pipe extending through said second connector element into said first connector element by means operable to draw the said connector elements progressively together axially of a said pipe upon rotation of the connector elements with respect to one another so as to effect a fluid tight connection of said pipe to said first connector element by said seal means, wherein said clamping means is mounted to the second connector element so as to be rotatable with respect thereto even after a said fluid tight connection has been made, so as by said rotation to bring said clamping means into a desired rotational position, and said clamping means is radially constrictable while in said rotational position to grip said pipe.

2. A connector as claimed in claim 1, wherein said connection between said first and second connector elements is by means of inter-engaging threads present on said connector elements.

3. A connector as claimed in claim 2, wherein said first connector element bears a male thread and said second connector element bears a corresponding female thread.

4. A connector as claimed in claim 1, wherein said sealing in comprising a sealing washer within the bore of the second connector element and so located as to be compressed axially of the pipe between the first connector element and the second connector element when said connector elements are connected together.

5. A connector as claimed in claim 1, wherein said second connector element comprises a radially outwardly protruding flange and said clamping means has a radially inwardly protruding flange cooperating therewith to retain the clamping means on the second connector element for rotation with respect thereto.

6. A connector as claimed in claim 1, wherein said clamping means is a split clamp provided with a clamping screw for tightening the clamp.

7. A connector as claimed in claim 1, wherein the first and second connector elements are of metal and the clamping means is of plastics.

8. A connector as claimed in claim 1, wherein said sealing means comprises a sealing washer within the cavity of the first connector element and so located as to be compressed axially of the pipe between the first connector element and the second connector element when said connector elements are connected together.

* * * * *